No. 866,320. PATENTED SEPT. 17, 1907.
J. R. ALLISON.
TIRE SETTING IMPLEMENT.
APPLICATION FILED NOV. 5, 1906.

WITNESSES:

James R. Allison,
INVENTOR.

By
ATTORNEYS

UNITED STATES PATENT OFFICE.

JAMES RUFUS ALLISON, OF AVINGER, TEXAS.

TIRE-SETTING IMPLEMENT.

No. 866,320.

Specification of Letters Patent.

Patented Sept. 17, 1907.

Application filed November 5, 1906. Serial No. 342,109.

*To all whom it may concern:*

Be it known that I, JAMES RUFUS ALLISON, a citizen of the United States, residing at Avinger, in the county of Cass and State of Texas, have invented a new and useful Tire-Setting Implement, of which the following is a specification.

This invention has relation to implements for setting tires upon vehicle wheels and it consists in the novel construction and arrangement of its parts as hereinafter shown and described.

The object of the invention is to provide an implement of the general formation of a pair of tongs with working ends of such configuration as to be especially adapted for stretching, prying and forcing a metal tire upon the wheel felly. The handle ends of the implement may be used for retaining the tire bolts against rotation when removing taps therefrom.

Figure 1:
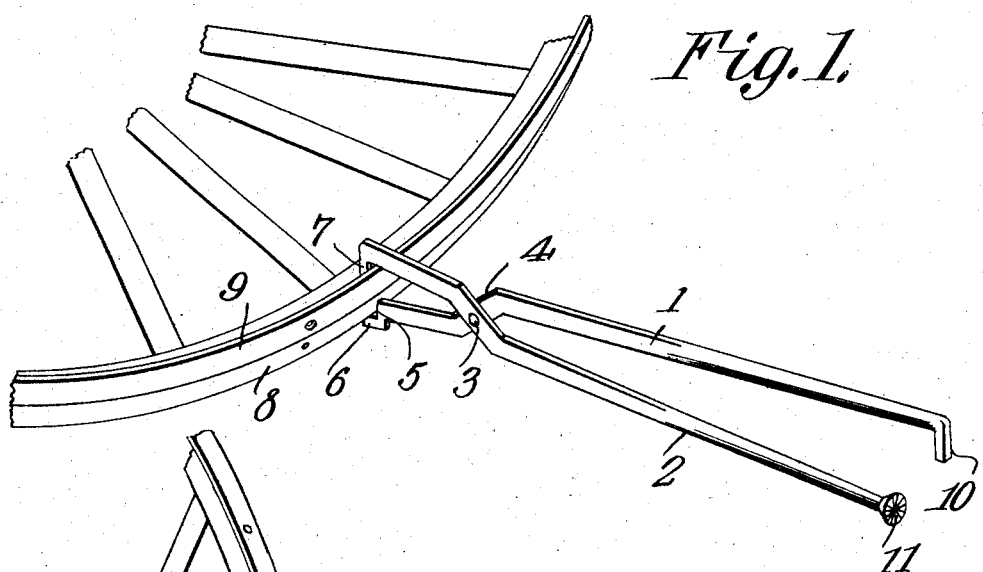
Figure 2:
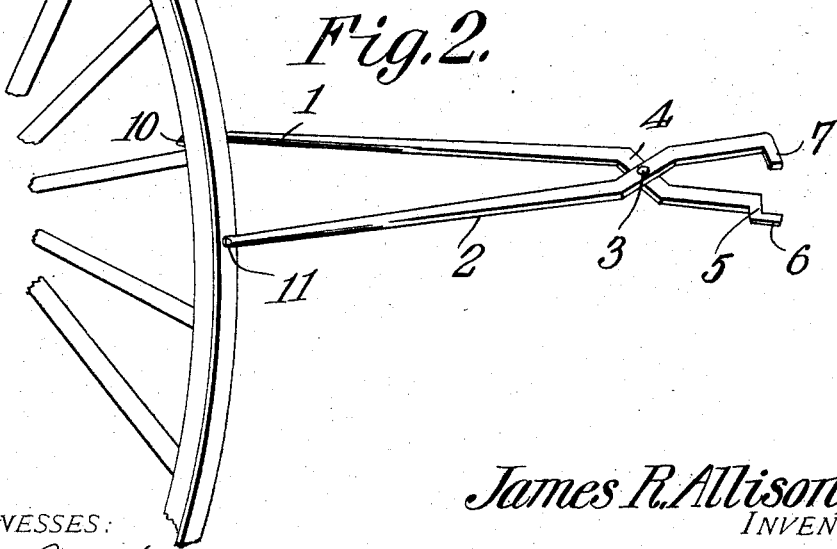

In the accompanying drawing:—Figure 1 is a perspective view of the implement illustrating the manner of applying the same to the wheel in setting the tire; and Fig. 2 is a perspective view of the implement illustrating the manner of applying the same to a wheel in order to retain a tire bolt against rotation.

The implement comprises the members 1 and 2 which are pivoted together at the point 3. The portions of the members 1 and 2 adjacent the pivot 3 are straight as at 4 and are in substantial cruciform relation to each other. The end of the member 1 terminates in a shoulder 5 below which is located a lug 6. The end of the member 2 is provided with the rectangularly extending lug 7.

In the operation of setting a tire the implement is used as follows:—The shoulder 5 is placed against the periphery of the felly 8 and the lug 6 is projected under the said felly. The tire 9 is placed around the felly but by reason of the fact that the inner dimensions of the tire so nearly coincide with the extreme dimensions of the felly the said tire must be pried in place in order to completely surround the felly, therefore, the hook 7 is placed over the edge of the tire 9 and by working the implement as a lever the tire 9 will gradually become seated upon the felly 8.

The handle end of the member 1 is provided with a hook 10 which may be conveniently used for carrying a hot tire from the heater to the wheel. The handle end of the member 2 is provided with a bolt head engaging means 11 which in the form as shown in Fig. 1 is substantially circular with radial ridges, while in the form as shown in Fig. 2 is an edge or point. The implement is applied to a wheel in the manner as shown in Fig. 2 when it is desired to retain a tire bolt against rotation while removing the tap therefrom. The form illustrated in Fig. 1 is best adapted for holding heavy tire bolts while the form illustrated in Fig. 2 is especially adapted for holding small tire bolts.

Having described my invention what I claim as new and desire to secure by Letters-Patent is:—

A tie setting implement comprising a pair of levers each having a jaw, one jaw having an outwardly offset portion and the other having an inwardly-projecting arm beyond the shoulder formed by the offset of the first-named jaw, one of the levers having at its end opposite the jaw a flattened serrated bolt-engaging head and the other lever having at the end opposite its jaw an inwardly-projecting hook that extends beyond the bolt-engaging head to engage under a rim.

In testimony that I claim the foregoing as my own, I have hereto affixed my signature in the presence of two witnesses.

JAMES RUFUS ALLISON.

Witnesses:
A. V. SIMPSON,
P. B. BAKER.